United States Patent [19]
Pazmany

[11] 3,915,415
[45] Oct. 28, 1975

[54] OVERWING THRUST REVERSER

[75] Inventor: Ladislao Pazmany, San Diego, Calif.

[73] Assignee: Rohr Industries, Inc., Chula Vista, Calif.

[22] Filed: Mar. 21, 1974

[21] Appl. No.: 453,379

[52] U.S. Cl. ...... 244/110 B; 60/226 A; 239/265.29; 239/265.37; 244/53 R
[51] Int. Cl.² .......................................... B64C 15/08
[58] Field of Search ............ 244/110 B, 12 D, 23 D, 244/52, 53 R, 53 B; 239/265.19, 265.27, 265.29, 265.37, 265.41; 60/226 A, 229, 230

[56] References Cited
UNITED STATES PATENTS

| | | | |
|---|---|---|---|
| 3,186,661 | 6/1965 | Denning et al. | 244/53 B |
| 3,262,271 | 7/1966 | Beavers | 60/230 |
| 3,519,207 | 7/1970 | Clough | 239/265.41 |
| 3,688,989 | 9/1972 | McMurty | 239/265.37 X |
| 3,791,586 | 2/1974 | Moorehead | 244/110 B X |
| 3,844,482 | 10/1974 | Stearns | 239/265.37 |

Primary Examiner—Trygve M. Blix
Assistant Examiner—Barry L. Kelmachter
Attorney, Agent, or Firm—Patrick J. Schlesinger; Jay D. Gordon; Frank D. Gilliam

[57] ABSTRACT

A thrust reverser for utilization on wing mounted jet powered aircraft in which all exhaust gases are discharged over the wing thereof. The jet engine is housed in a nacelle which has inner and outer skins and which is affixed to the forward edge of the wing. The lower portion of the nacelle is contoured to form a continuous aerodynamic profile with the wing. The reverser is comprised of a target blocker door and side blocker doors which depend from said target blocker door. A bank of cascades is nested between the target blocker door and the inner skin of the nacelle. Appropriate linkages are utilized to swing the target and side blocker doors to deployed conditions, and roller bearings are incorporated to maintain the blocker doors within controlled motion rails. Concurrent with the blocker doors being moved to deployed positons, the cascade bank is translated aft to a point where it intercepts the gases jammed by the blocker doors and diverts the flow into a forward component.

5 Claims, 5 Drawing Figures

OVERWING THRUST REVERSER

BACKGROUND OF THE INVENTION

The present invention relates to a thrust reverser for use with a wing mounted jet engine.

There is presently a rather substantial interest in vertical and short take-off and landing aircraft sometimes known as STOL and VTOL aircraft. Such craft would permit airports to be located closer to the centers of major cities and alleviate the problems that presently exist in traveling from the city to the airport.

A popular contemporary STOL configuration under consideration by airframe manufacturers is the connection of the power plant on the wings, the wings being swingable to a vertical or take-off position. This requires that the power plant be connected directly to the forward edge of the wing rather than being suspended therefrom by means of a pylon.

In one such embodiment, thrust reversal during ground roll is accomplished by an aft tilt wing portion which is swingable to vertical, thrust blocking position. This structure is not particularly efficient since there is no provision made for turning vanes which impart a forward component to the airstream. The blocker of that structure is effective to jam the airstream but does not impart any forward component thereto.

In other prior art embodiments, the engines are mounted under the wing to provide for greater life thereon. The reversing apparatus is included within the confines of the wing and selectively actuated by the pilot. It should be evident that this arrangement is inefficient since not all the exhaust gases are redirected through the reverser.

Another prior art structure is directed toward an engine which is mounted to the forward edge of the wing but discharges exhaust gases both over and under the wing. Two separate reverser mechanisms are necessary in this embodiment resulting in a duplication of deflecting and actuating structure. As applied to aircraft, the duplication of any equipment is undesirable particularly since it tends to increase the weight of the craft.

The present invention is effective to control the thrust reversing requirements of wing mounted jet aircraft. The apparatus is characterized by efficient action and effective reversal of thrust.

SUMMARY OF THE INVENTION

A preferred embodiment of the thrust reverser of the instant invention is characterized by a target blocker door that is swingable to a blocking position whereby it jams the exhaust gases which are passed over the wing of the craft. Side blocker doors depend from the target door and serve to prevent exhaust gases from passing out of the sides of the reverser. In the stowed position, the blocker door forms part of the aerodynamic profile of the nacelle which is affixed to the forward part of the wing of the aircraft.

A bank of cascades is nested between the target blocker door and the inner skin of the nacelle. A lost motion connector operatively connects the cascade bank to the target blocker door such that as the blocker door is pivotable to its deployed position, concurrently, the cascade bank is translated aft and intercepts the airstream jammed by the blocker doors.

Actuating means includes a linkage active on the side blocker doors to swing those doors to their blocking position. The blocker doors include roller bearings which are captured in guides which control the path of movement of the blocking doors.

The above and other aspects of the present invention will be apparent as the description continues and when read in conjunction with the appended drawings.

DETAILED DESCRIPTION OF THE DRAWINGS

Figure 1:
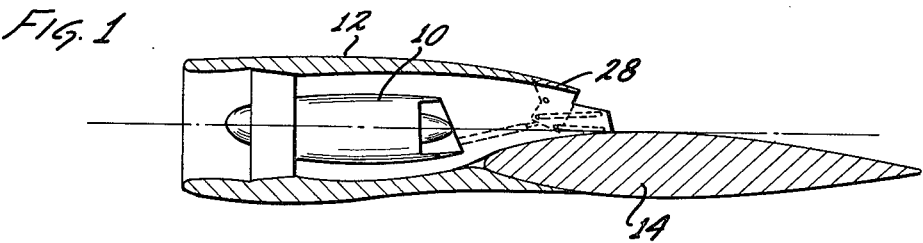
FIG. 1, is a schematic of reversing apparatus of the instant invention as utilized on a wing mounted jet engine.

According to FIG. 1, a fan jet engine 10 is shown housed in a nacelle 12. The nacelle is mounted on the leading edge of the wing 14, the remainder of the aircraft not being illustrated.

It should be understood that the reversing apparatus hereinafter described is not limited in use to STOL or VTOL aircraft. The nacelle herein disclosed can be utilized on STOL aircraft which are characterized by a very short take-off and landing runs. There have been many variations for these planes some of which are capable of hovering much as a helicopter. The aircraft utilizing the nacelle and reversing structure of the instant invention comtemplates a wing structure that tilts upwardly so that the engine discharge is directed toward the ground. Once the plane is airborne, the wings are swung back to the normal cruise position with the engine thrust generally parallel to the aircraft fuselage. The reverser herein described can also be used by fixed wing aircraft. The structure hereinafter described and claimed is not to be strictly limited to a particular STOL concept. It is merely desired to frame this invention in a representative environment for ease of description. In fact, it should be readily understood that the apparatus of the instant invention is not limited to STOL aircraft but may be utilized whenever the aerodynamic considerations demand its usage.

The nacelle 12 consists of outer 16 and inner 18 skins. The lower portion 20 of that nacelle is connected to the wing 14 and is contoured to form part of the aerodynamic profile of the craft. The precise method of connection between the nacelle 12 and wing 14 is not particularly pertinent for the purposes of the present invention but it should be noted that this arrangement, in effect, eliminates the exhausting of gases under the wing 14. The exhaust gases are permitted to flow only above the wing and the reversing apparatus need only be effective for overwing flow.

Figure 2:
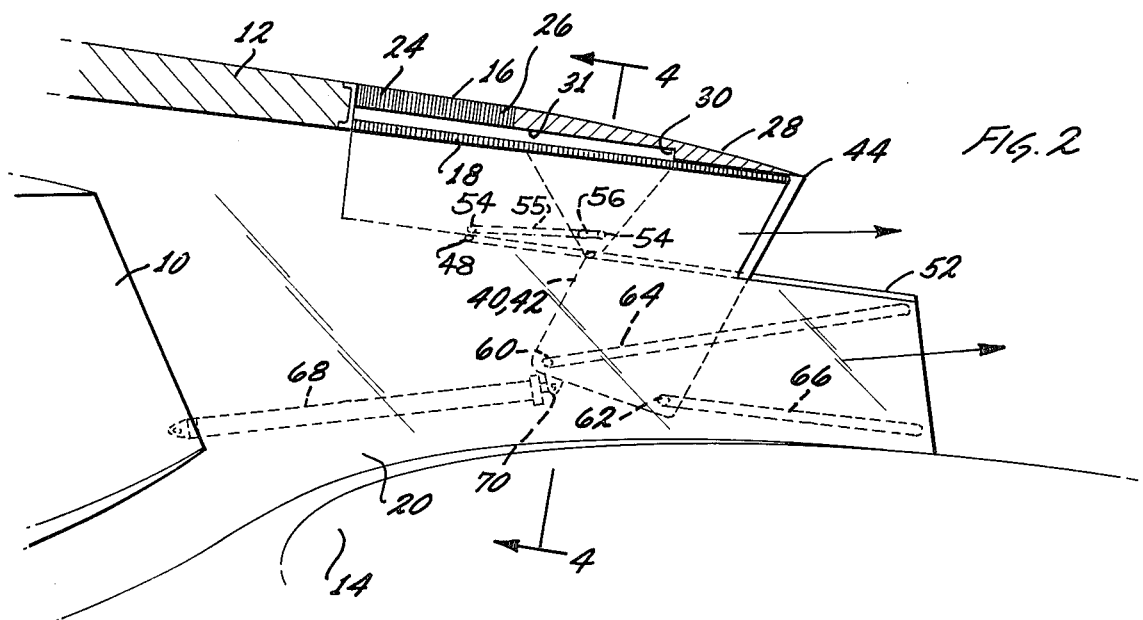
FIG. 2, is a side elevational view partially in cross section, of the reversing apparatus of the instant invention shown in stowed position.
Figure 3:
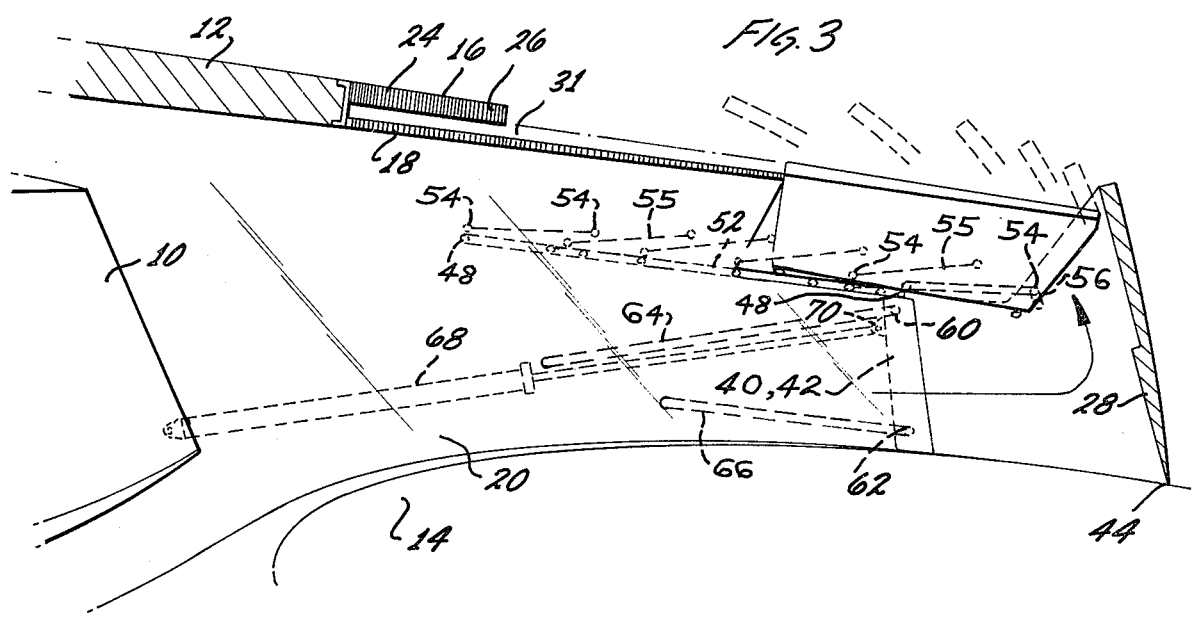
FIG. 3, is a side elevational view similar to FIG. 2, with the reversing apparatus in deployed condition.

From FIG. 2, it is seen that the nacelle 12 is sectioned into leading 22 and trailing 24 sections. The trailing section 24 is itself split into a fixed part 26 and a target blocker door 28. The blocker door is exteriorly contoured to form part of the aerodynamic profile of the nacelle 12 in stowed position. Interiorly, the blocker door 28 is notched 30 so as to continue the cavity 31 formed between the outer skin and the inner skin 18. The fixed upper nacelle portion 26 adjacent outer skin 16 is appropriately spaced from the inner skin 18 so that the cavity 31 runs the length of the trailing section 24 up to the notch 30 back wall. It can be readily seen in the last mentioned figure and FIG. 3 that a linkage bar 55 is provided between the cascade bank 46 and blocker door 28. Linkage bar 55 has a roller bearings 54, attached at each end. Roller bearing 54 attached at one end is held captive within slot 56 of the blocker door while the other roller bearing 54 is pivotly attached to the opposite end of the linkage bar and attached to the cascade bank 46. The movement of the various components is hereinafter discussed.

Figure 4:
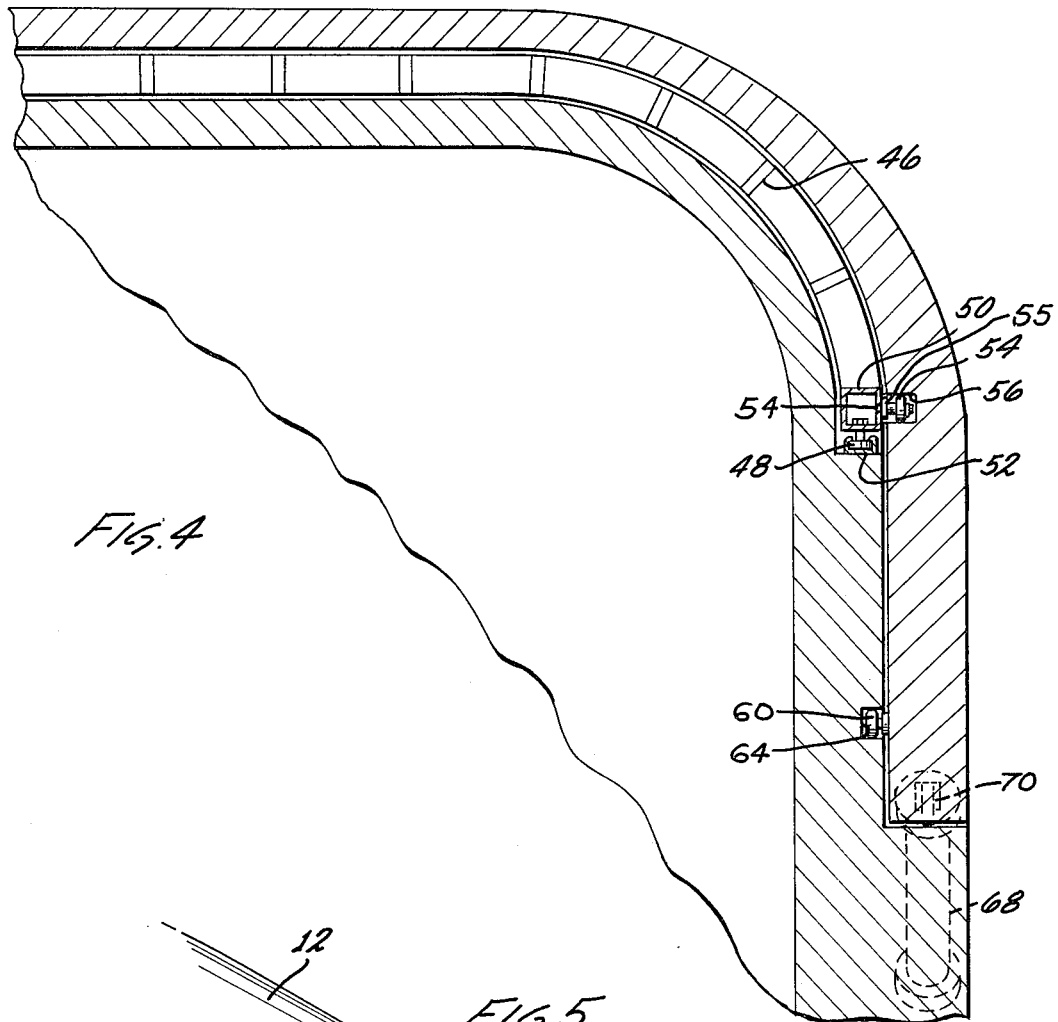
FIG. 4, is a cross sectional view of the roller bearings utilized by the reversing apparatus.
Figure 5:
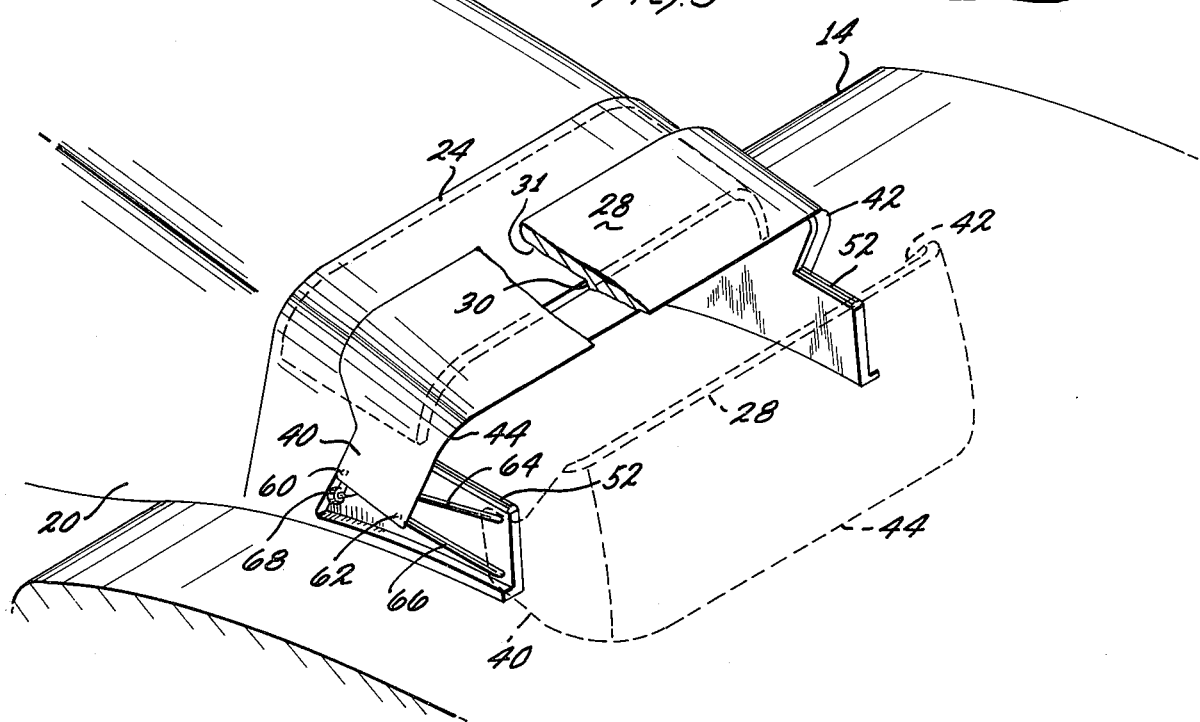
FIG. 5, is perspective view of the apparatus of the instant invention, partially cut-away.

From FIGS. 4 and 5, it is seen that the blocker door 28 includes depending flaps 40, 42 which may be integrally formed with that blocker door. The function of those flaps is two fold: firstly, they serve to seal the sides of the reverser from transverse leakage; and secondly, it is to these flaps that the operating linkages are connected. During reversal of the thrust, the aft edge 44 that extends between the flaps and the blocker door sealingly contacts the nacelle 12. The apparatus that is responsible for the deployment of the blocker door will be described in greater detail as the description continues.

As shown in FIGS. 4 and 5, a bank of cascades 46 is assembled as a one piece unit and is nested in recess 30. That cascade bank is deployed by translating it aft along with the blocker door 28. The lower edges of the cascade bank include followers 48 connected by means of suitable reinforcing structure 50. The followers 48 are captured within guide tracks 52 which are disposed along the bottom wall of recess 30. The operating linkage comprise a pair of like bars or links positioned one on each side of the blocker door 28. One end of the bar linkage is pivotally connected through a bearing means 54 to the reinforcing structure 50. The opposite end of the bar linkage is pivotally connected to a second bearing 54. The outer periphery of the second bearing 54 is confined for lateral movement in an elongated slot 56 formed in the interior surface of the blocker door 28. That slot extends only part way across that blocker door so that at least for part of the translation of the blocker door the bearing 54 confined within slot 56, hereinbefore described, moves from the forward wall of the slot to the rearmost wall of the slot before there is any complementary movement of the cascade bank. At a certain point the slot is terminated, upon which the wall bounding the slot acts on the roller bearings 54 to drive the cascade bank aft. In a similar fashion, there is an opposite wall bounding the slot 56 which acts on the roller bearings to drive the cascade bank forward during stowing of the apparatus. In other words, provision is made for lost motion between the cascade bank and the blocker door while the bearing 54 moves along slot 56 from one end to the other so that the movement of the cascade bank is less then that of the blocker door.

The actuating means which is used to both stow and deploy the reversing apparatus is best illustrated in FIG. 2. The flaps 40, 42 are fitted with roller bearing systems at 60, 62. Those bearing systems are received in guide tracks 64, 66 which direct and control the motion of the blocker door 26. A conventional actuator 68 is pivotally connected to that blocker door to the lower leading edge at position 70. The actuator merely forces roller bearing 60 along the tracks 64, and since this track is inclined, the blocker door pivots as it translates aft. Reverse movement of the actuator causes the blocker door to upright itself as it moves forward.

It has been seen that the reversing apparatus embodying the present invention is characterized by a simple mechanism that deploys and stows the apparatus by an economical and reliable movement. The reversal of the airstream is exceptionally efficient and there is little or no leakage in the system.

Many changes may be made in details of the instant invention, in the method and materials of fabrication, in the configuration and assemblage of the constituent elements, without departing from the spirit and scope of the appended claims, which changes are intended to be embraced therewithin.

I claim:

1. In a thrust reverser utilized on a wing mounted jet engine powered aircraft, said engine discharging its exhaust gases over the upper surface of the wing thereof and housed in a nacelle having inner and outer skins supported by structure therebetween said nacelle being affixed to the forward part of the wing of the aircraft, the lower portion of said nacelle being appropriately contoured for connection to said wing such that the outer skin on said lower portion forms a continuous aerodynamic profile with said wing the upper portion of said nacelle having an outer skin of a smaller rearward dimension than its adjacent inner skin with a portion of said support structure cut away to form a first cavity therein, a shell, in its stowed position forming a part of the aerodynamic profile of said nacelle, said shell including an exterior target blocker door stowed substantially parallel and adjacent said inner skin, said blocker door interiorly contoured to define a second cavity with said inner skin of the nacelle portion said second cavity being contiguous with said first cavity, a pair of vertically depending side blocker doors one of said side blocker doors attached at each side of said blocker door forming, in a stowed position, part of the aerodynamic profile of said nacelle each of said side blocker doors include roller bearing means captured within a pair of fixed tracks on each side of said nacelle, said tracks controlling the path of movement of said reverser, a bank of cascades nested in said cavities during stowed condition, linkage connector means movably connecting said bank of cascades to said shell, and actuating means active on said shell to deploy said shell aft of said nacelle and simultaneously pivot said shell such that the trailing edges of said target blocker door and said side blocker doors sealingly contact the upper skin of said wing to block the flow of exhaust gases over said wing, said linkage connector being additionally operative after a predetermined length of movement of said target blocker door for translating said bank of cascades aft such that the trailing edge thereof is adjacent the forward edge of said target blocker door said bank of cascades being active to direct the exhaust gases jammed by said blocker door into a forward flow component.

2. In the reverser of claim 1 said linkage connector means comprises a lost motion bar linkage.

3. In the reverser of claim 1, said actuating means comprises a drag linkage active on and pivotally connected to the forward bottom corners of said side blocker doors.

4. In the reverser of claim 1, said bearings are connected to lower right and left corners of said side blocker doors.

5. In the reverser of claim 1, the trailing edges of said blocker doors are contoured to sealingly engage the upper skin of said wing.

* * * * *